March 2, 1971 R. J. BRATTON 3,567,472
MAGNESIUM-ALUMINATE SPINEL MEMBER HAVING CALCIUM OXIDE
ADDITION AND METHOD FOR PREPARING
Filed March 28, 1968

INVENTOR
Raymond J. Bratton
BY
W.D. Palmer
ATTORNEY

United States Patent Office 3,567,472
Patented Mar. 2, 1971

3,567,472
MAGNESIUM-ALUMINATE SPINEL MEMBER HAVING CALCIUM OXIDE ADDITION AND METHOD FOR PREPARING
Raymond J. Bratton, Monroeville, Pa., assignor to Westinghouse Electric Corporation, Pittsburgh, Pa.
Filed Mar. 28, 1968, Ser. No. 716,890
Int. Cl. C04b 33/00
U.S. Cl. 106—39                                    5 Claims

ABSTRACT OF THE DISCLOSURE

Light-transmitting spinel ceramic member, which is particularly adapted for use as a discharge device arc tube, has added thereto a small amount of calcium oxide. The spinel member is easily sintered and has improved strength and light-transmission properties. In the method for preparing such a member, a small amount of calcium oxide is distributed throughout spinel powder, the mixture is compacted, and thereafter sintered in accordance with a predetermined schedule.

CROSS-REFERENCE TO RELATED APPLICATION

In copending application Ser. No. 716,907, filed concurrently herewith, now abandoned, by Raymond J. Bratton and owned by the present assignee is disclosed a method for preparing very pure spinel powder of a particle size and shape which is very carefully controlled. Such a powder may be used as a starting material in preparing the spinel member in accordance with the present invention.

BACKGROUND OF THE INVENTION

This invention relates to spinel members and methods for preparing same and, more particularly, to a spinel member which incorporates a small addition of calcium oxide in order to improve the quality of such member, and to a method for preparing such a member.

Polycrystalline oxide materials are known for their excellent resistance of corrosive environments such as high-temperature alkali-metal vapor and their relatively high degree of transparency, as well as their ability to retain these properties at extremely high temperatures. Such bodies have particular application as arc-enclosing envelopes for very high temperature, alkali-metal vapor discharge devices, space age applications, high-temperature furnaces, etc.

Polycrystalline oxide bodies which are formed of alumina are known and are described in U.S. Pat. No. 3,026,210, dated Mar. 20, 1962. In U.S. Pat. No. 3,155,534, dated Nov. 3, 1964, is described a method for making a magnesia-alumina spinel body.

Spinel bodies are isotropic and have a higher melting temperature and a better alkali-metal resistance than polycrystalline alumina bodies. For this reason they should be more suitable than polycrystalline alumina for many applications, and particularly for arc tubes for discharge devices. Some troubles have been encountered, however, in providing the spinel members with adequate strength characteristics and this has limited the use of such material.

SUMMARY OF THE INVENTION

It is the general object of this invention to provide a light-transmitting polycrystalline spinel member which has improved strength characteristics and light-transmission characteristics.

It is another object to provide a spinel member which is readily processed by cold pressing and then sintering.

It is a further object to provide a method for preparing a spinel member which is readily processed by sintering and which after sintering has improved strength and light-transmitting characteristics.

The aforesaid objects of the invention, and other objects which will become apparent as the description proceeds, are achieved by providing a light-transmitting polycrystalline spinel member which has calcium oxide distributed therethrough in amount of from 0.1 to 1.5% by weight of the spinel. Such a member is particularly adapted for use as an arc tube for a discharge device. In the method for preparing such a member, finely divided calcium oxide in the foregoing proportions is distributed throughout spinel powder, the resulting mixture compacted, and thereafter sintered, preferably in accordance with a two-step sintering procedure.

BRIEF DESCRIPTION OF THE DRAWINGS

For a better understanding of the invention, reference should be made to the accompanying drawings, wherein.

DESCRIPTION OF THE PREFERRED EMBODIMENTS

Figure 3:
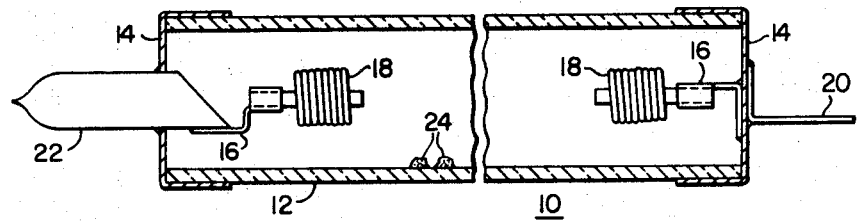
FIG. 3 is an elevational view, partly in section, of a discharge device wherein a spinel member of the present invention constitutes the envelope for the device.

In order to prepare the improved spinel member of the present invention, small additions of calcium oxide are thoroughly mixed into spinel powder. Such spinel powder of carefully controlled particle size and shape can be processed in accordance with the teachings set forth in the aforementioned copending application Ser. No. 716,907, filed concurrently herewith, now abandoned. More specifically, such a spinel powder is prepared by mixing 1.5 molar solutions of magnesium chloride and aluminum chloride, with the gram-atom ratio of total magnesium in solution to total aluminum in solution being 1:2. The solution is heated to 80° C. and slowly added to an ammonium hydroxide solution having a pH which is maintained between 9.5 and 10. The resulting precipitate is maintained at approximately 80° C. for one-half hour, cooled to room temperature, separated from the residual solution, thoroughly water-washed, and slowly dried at a temperature of 100° C. The resulting dried cake is crushed sufficiently to pass a 100 mesh screen, and the dried and crushed precipitate is then fired under nonreactive conditions at a temperature of about 1100° C. for about four hours in order to form the very fine and uniform spinel powder. While the foregoing spinel powder is very satisfactory, other spinel powders can be used as starting materials in accordance with the present invention.

The foregoing spinel powder is mixed with very finely divided calcium oxide, with the calcium oxide constituting from 0.1% by weight to 1.5% by weight of the spinel. As a first example, such a mixing can be accomplished by mechanically blending with high speed agitation a water or alcohol suspension of spinel particles and any of calcium carbonate, calcium oxalate or calcium hydroxide. After thorough mixing, the particles are then fired under nonreactive conditions, as example being an air atmosphere, at a temperature of from 800° C. to 1000° C. in order to remove the volatile products from the calcium salt and convert same to the oxide. As a second example, the mixture can be prepared by mechanically blending by high speed agitation an alcohol suspension of spinel powders and finely divided calcium oxide per se. As a third and preferred example, spinel powders can be thoroughly mixed into a calcium salt solution by mechanically blending and examples of such a calcium salt solution are calcium nitrate, calcium sulfate or calcium chloride. After blending, the solution is dried and fired in the manner as specified hereinbefore under the first example.

As still another method for mixing the spinel powder and calcium oxide, high purity spinel powders can be prepared by mixing and calcining alums of magnesium and aluminum. More specifically, $(NH_4)_2SO_4 \cdot MgSO_4$ and $NH_4Al(SO_4) \cdot 12H_2O$ in the molar ratio of 1:2 are heated to from 100° C. to 300° C. to form a liquid phase and thereby obtain intimate mixing. The resulting mixture is calcined at 1100° C. to 1200° C. to remove volatiles and effect the spinel reaction. The addition of the calcium oxide can be made either prior to or after the decomposition of the mixed alums. If desired, the calcium can be added as calcium sulfate ($CaSO_4 \cdot 2H_2O$) added to the mixture prior to the alum decomposition.

After the powder mixture is prepared, with the calcium oxide constituting from 0.1 to 1.5 weight percent of the spinel powder, the powder is compacted at pressures of from 5 tons per square inch to 25 tons per square inch. When forming tubular-shaped members, the powder is pressed isostatically at pressures of from 15,000 to 60,000 p.s.i. It has been found that the pressed members should have a bulk density of at least 45% of theoretical maximum density in order to achieve the desired density which approximates theoretical and desired optical properties in the final sintered member.

After pressing, it is desirable to provide the pressed body with some slight degree of incipient sintering in order to facilitate handling and as an example, the compact is heated under nonreactive conditions for about one hour at a temperature of about 1100° C. The initial heating and the sintering can be carried out either in vacuum, inert gas, hydrogen, or oxygen, all of which constitute nonreactive heating and firing conditions. While the initial heating to effect the incipient sintering can be dispensed with if desired, it is preferably used and is conducted at a temperature of from about 1000° C. to 1200° C. for at least about one-half hour.

After the initial heating, the member preferably is sintered under nonreactive conditions, as before, at a temperature of from about 1300° C. to 1600° C. which causes the compact to shrink somewhat. This sintering is continued until the compact dimensions remain substantially constant. As a specific example, the member is heated at a temperature of approximately 1500° C. for a period of at least one-half hour, at which time substantially all shrinkage will have occurred.

Figure 1:
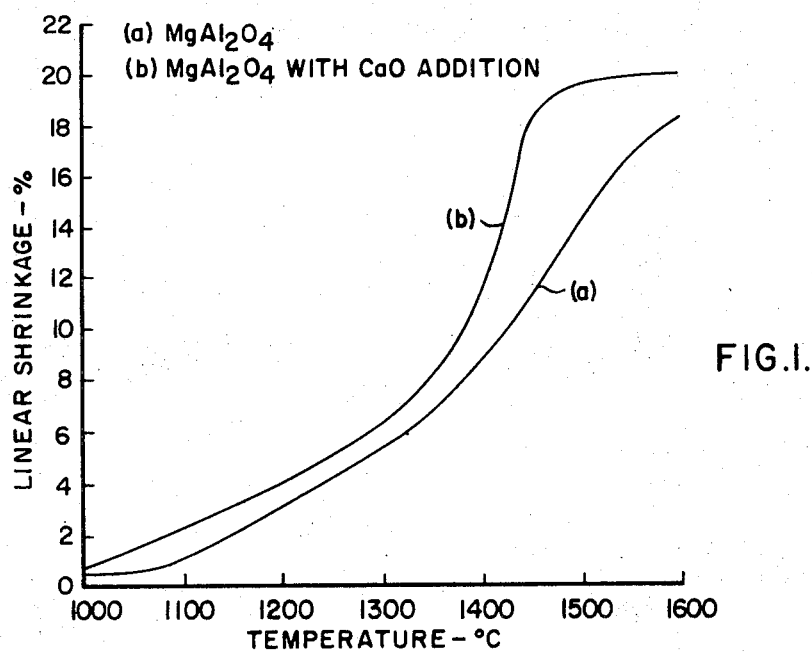
FIG. 1 is a graph of linear shrinkage in percent versus intermediate sintering temperature, comparing the sintering rates of spinel powder per se and spinel powder which has a small calcium oxide addition.

The calcium oxide addition has a marked effect in speeding up the rate of sintering, and thus the rate of shrinkage of the member during the initial sintering period. In FIG. 1 is shown a graph of linear shrinkage in percent versus firing temperature wherein the curve designated $a$ is the control specimen formed of spinel per se and the curve designated $b$ represents the modified spinel of the present invention which incorporates the calcium oxide addition. As shown therein, the rate of sintering is considerably faster with the calcium oxide addition, and sintering occurs at a relatively lower temperature.

Figure 2:
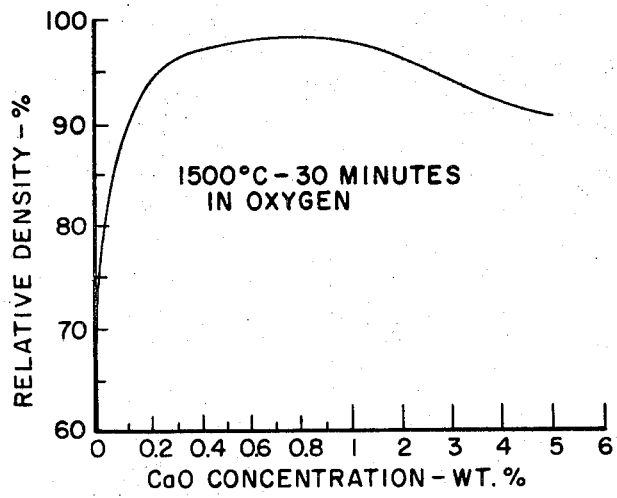
FIG. 2 is a graph of relative density, after the intermediate sintering step, versus the weight percent addition of calcium oxide as added to a spinel powder prior to sintering.

The density which is obtained with the initially sintered, calcium oxide-modified spinel member is substantially enhanced and in FIG. 2 is shown a graph of relative density versus calcium oxide concentration. As shown in FIG. 2, within the range of from 0.1 weight percent addition to 1.5 weight percent addition of calcium oxide distributed throughout the spinel, the density of the initially sintered member is substantially increased.

In the next step of processing, the initially sintered member is further sintered, preferably for at least four hours, by heating same under nonreactive conditions, as before, at a temperature of from 1750° C. to 1900° C. for a sufficient period of time that the bulk density for the sintered member is at least about 99.3% of theoretical maximum density. More specifically, such sintering can be conducted at 1800° C. for periods up to sixteen hours which will provide an extremely dense sintered member.

As an alternative sintering procedure, the compact is sintered by gradually heating under the nonreactive conditions within the temperature range of from 1300° C. to 1750° C. to cause the compact to shrink substantially to its final dimensions, and the compact is additionally sintered by heating same under the nonreactive conditions at a temperature of from 1750° C. to 1900° C. for a sufficient period of time that the bulk density for the sintered member is at least about 99.3% of theoretical maximum density. As a specific example, the compact is gradually heated from 1300° C. to 1750° C. through a period of one hour, and thereafter the compact is heated at a temperature of 1800° C. for sixteen hours.

In addition to enhancing the sintering rate, the mixed calcium oxide causes the grain growth within the member during the sintering to be quite uniform and discontinuous grain growth is inhibited. This minimizes porosity which improves the light-transmission characteristics of the final member as well as the strength of the member. As a measure of the lack of porosity, spinel members of the present invention are substantially transparent to the eye. This is to be contrasted with polycrystalline alumina members which are quite milky in appearance.

In FIG. 3 is shown a discharge lamp 10 which incorporates a tubular body 12 formed of the present modified spinel. Such a lamp is described in greater detail in copending application Ser. No. 661,700, filed Aug. 18, 1967 and owned by the present assignee. The spinel member 12 has the configuration of a hollow tube and the ends thereof are sealed by refractory metal end caps 14 which can be formed of tantalum, for example. The tantalum end caps in turn are sealed to the ends of the arc tube 12 by a suitable oxide seal which can consist of 41% by weight calcium oxide, 8% by weight magnesium oxide and 51% by weight aluminum oxide. Affixed to the end caps 14 are electrode supports 16 which carry conventional electrodes 18 operatively mounted within the tube 12 proximate the ends thereof. Lead-in conductors 20 and 22 are electrically connected to the electrodes 18 in order to facilitate operation of the device. Contained within the device is a conventional discharge-sustaining filling 24 which as an example comprises mercury and sodium, as is known in the art. In order to facilitate outgassing and sealing, one of the lead-in conductors 22 can be formed as a pinched off tantalum tube. The device also contains a small charge of inert ionizable starting gas, such as argon.

It will be recognized that the objects of the invention have been achieved by providing an improved light-transmitting polycrystalline spinel member which has excellent light-transmission characteristics and strength as well as a discharge device which incorporates such a member. There has also been provided a method for making such an improved polycrystalline spinel member.

While preferred embodiments of the invention have been illustrated and described in detail, it is to be particularly understood that the invention is not limited thereto or thereby.

I claim as my invention:

1. A hollow tubular visible light-transmitting polycrystalline member consisting essentially of calcium oxide and magnesium aluminate spinel wherein the gram-atom ratio of magnesium to aluminum is 1:2, said calcium oxide is distributed throughout said spinel in amount of from 0.1 to 1.5 weight percent of said spinel, and said member has a density which is at least about 99.3% of the maximum theoretical density for said member.

2. The spinel member as specified in claim 1, wherein said hollow tube has ends thereof sealed, with electrodes operatively mounted within the tube and proximate the ends thereof, and said tube encloses a discharge-sustaining filling.

3. The spinel member as specified in claim 2, wherein said electrodes of said sealed tube are connected to lead-in conductors to form a discharge device.

4. The method of forming a visible light-transmitting ceramic magnesium aluminate spinel member having a high density and excellent visible light-transmitting characteristics, which method comprises:

(a) thoroughly distributing very finely divided calcium oxide throughout very finely divided spinel powder, with the calcium oxide constituting from 0.1 to 1.5 weight percent of the spinel powder, and with the spinel powder being magnesium aluminate spinel wherein the gram-atom ratio of magnesium to aluminum is 1:2;

(b) compacting said mixture substantially into the final configuration desired for said member, with the compacting pressure being from 5 to 25 tons per square inch, to provide a bulk density for the compacted member of at least 45% of theoretical maximum density;

(c) sintering said compact under nonreactive conditions by gradually heating same within the temperature range of from about 1300° C. to 1700° C. for at least about one-half hour to cause said compact to shrink substantially to its final dimensions; and (d) additionally sintering said compact by heating same under nonreactive conditions at a temperature of from 1750° C. to 1900° C. for a period of at least four hours to provide a bulk density for the sintered member of at least about 99.3% of theoretical maximum density.

5. The method as specified in claim 4, wherein prior to sintering of said compact, said compact is heated under nonreactive conditions at a temperature of from about 1000° C. to 1200° C. for at least one-half hour to effect a slight amount of incipient sintering sufficient to impart thereto sufficient strength to facilitate handling.

References Cited

UNITED STATES PATENTS

| | | | |
|---|---|---|---|
| 2,152,656 | 4/1939 | McDougal et al. | 106—46X |
| 2,805,167 | 9/1957 | McCreight et al. | 106—62 |
| 3,026,210 | 3/1962 | Coble | 106—39 |
| 3,083,123 | 3/1963 | Navias | 23—52X |
| 3,281,309 | 10/1966 | Ross | 106—39X |
| 3,304,153 | 2/1967 | Bakker et al. | 23—52 |
| 3,363,134 | 1/1968 | Johnson | 313—220 |
| 3,432,314 | 3/1969 | Mazdiyasni et al. | 106—39X |
| 3,441,421 | 4/1969 | Sarver et al. | 106—39 |

FOREIGN PATENTS

| | | | |
|---|---|---|---|
| 697,231 | 9/1953 | Great Britain | 106—62 |

TOBIAS E. LEVOW, Primary Examiner

W. R. SATTERFIELD, Assistant Examiner

U.S. Cl. X.R.

106—42, 58, 62; 313—221